Jan. 13, 1970  M. KATZ ET AL  3,489,630
METHOD OF MAKING A FABRIC COVERED BELT BACKING
Filed Oct. 20, 1965  2 Sheets-Sheet 2
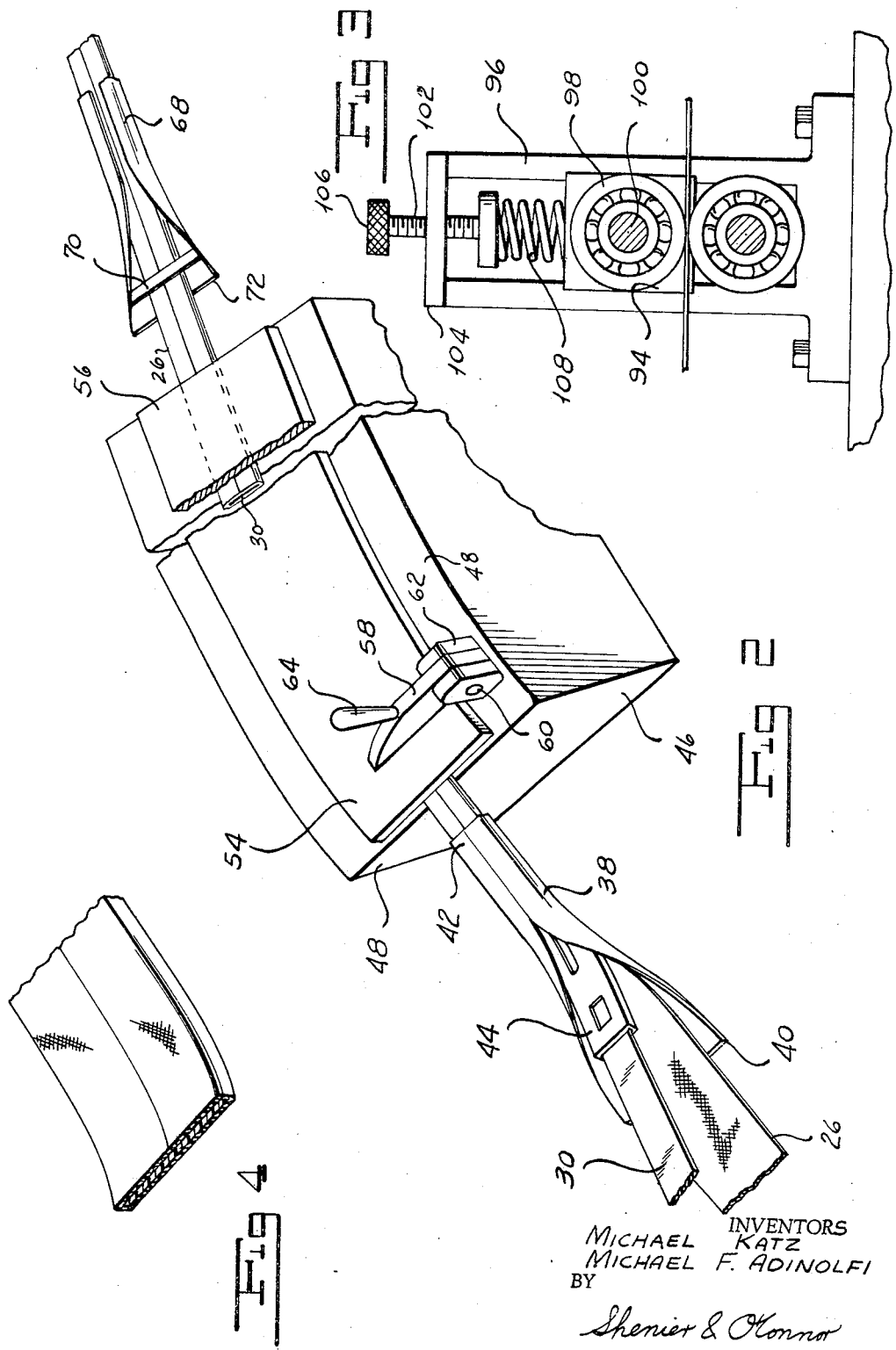
INVENTORS
MICHAEL KATZ
MICHAEL F. ADINOLFI
BY
Shenier & O'Connor
ATTORNEYS

# United States Patent Office

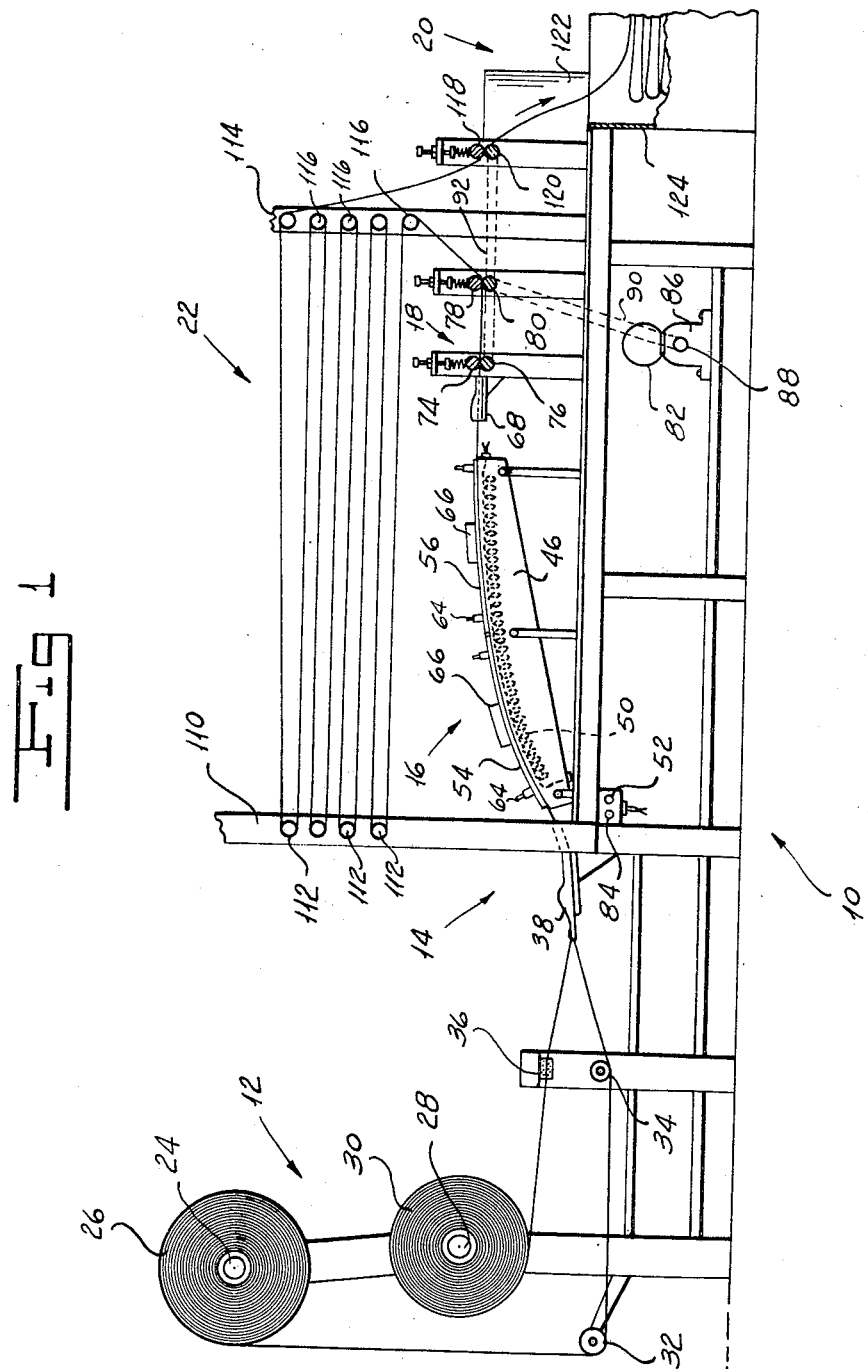

3,489,630
Patented Jan. 13, 1970

3,489,630
METHOD OF MAKING A FABRIC COVERED BELT BACKING
Michael Katz, Bronx, and Michael F. Adinolfi, Brooklyn, N.Y., assignors to E–Z Buckle Inc., New York, N.Y., a corporation of New York
Filed Oct. 20, 1965, Ser. No. 498,705
Int. Cl. A41f *3/02;* B31f *1/00*
U.S. Cl. 156—202           1 Claim

ABSTRACT OF THE DISCLOSURE

A method of and apparatus for making a fabric covered belt backing in which a length of thermoplastic material of a certain width is advanced in contacting relationship with a length of wider outer material through a folder which folds the edges of the cover material over the edges of the thermoplastic material toward the centerline thereof. Following the folding operation, the advancing assembly is heated to soften the thermoplastic material and in the course of this heating operation, pressure is applied to the assembly. After leaving the heating and pressurizing unit, the assembly is carried through an elongated path comprising a number of adjacent portions of generally the same length to permit the thermoplastic material slowly to set to form the improved belt backing. Preferably the folded over edges of the cover material are butted in the region of the centerline of the thermoplastic material.

---

Our invention relates to a method of and apparatus for making fabric covered belt backing and more particularly to a method and apparatus for forming an improved fabric covered belt backing continuously in a rapid and expeditious manner.

There are known in the prior art various forms of backing adapted for use in making fabric covered belts. The material is sufficiently rigid to support a cover fabric and yet is flexible enough to permit its use in a belt. Very often lengths of backing are sold as components of kits which can be used by a dressmaker, for example, to make a belt which matches a particular dress.

One form of fabric covered belt backing known in the prior art comprises a core of material formed with corrugations on one side. A cover material is applied to the core by folding the cover material for a short distance over the edges of the core and adhering it thereto. We have discovered that one defect of this type of fabric covered belt backing is its tendency to shrink when washed and ironed.

The apparatus which has been employed in the prior art to form fabric covered belt backing is crude and the backing produced thereby has a tendency to twist and become distorted in the course of its formation resulting in difficulties in subsequent handling wherein the backing is cut to length and the individual lengths packaged.

We have invented a method of and apparatus for producing an improved fabric covered belt backing. Our method and apparatus produce backing continuously without distortion or twisting of the backing. Our method and apparatus permit of the manufacture of backing in a rapid and expeditious manner. The backing produced by our method and apparatus may be cut to length and packaged without difficulty. Our method and apparatus enable us to produce fabric covered backing at less cost than is possible with methods and apparatus of the prior art.

One object of our invention is to provide a method of and apparatus for producing improved fabric covered belt backing.

Another object of our invention is to provide a method of and apparatus for producing fabric covered belt backing continuously without twisting, curling or other distortion of the backing.

A further object of our invention is to provide a method of and apparatus for producing fabric covered belt backing rapidly and expeditiously and at less cost than is possible in the prior art.

Other and further objects of our invention will appear from the following description.

In general our invention contemplates the provision of a method of and apparatus for producing fabric covered belt backing in which lengths of a cover material and of a thermoplastic material of a width approximately half the width of the cover material are drawn in superposed relationship successively through a folding zone wherein the cover material edges are folded over the edges of the thermoplastic material and are butted adjacent the centerline of the thermoplastic material, then through a heating zone wherein heat and pressure are applied to the lengths, then through a pressure zone wherein pressure is applied to the folded assembly and finally through a cooling zone wherein the plastic material is permitted to set slowly while the assembly is under a slight tension to avoid curling or twisting of the material.

In the accompanying drawings which form part of the instant specification and which are to be read in conjunction therewith and in which like reference numerals are used to indicate like parts in the various views:

FIGURE 1 is a side elevation of our apparatus for performing our method of making improved fabric covered belt backing.

FIGURE 2 is a fragmentary perspective view of a portion of the apparatus illustrated in FIGURE 1.

FIGURE 3 is a side elevation illustrating the construction of one pair of pressure rolls of our apparatus.

FIGURE 4 is a fragmentary perspective view illustrating the improved fabric covered belt backing produced by our method and apparatus.

Referring now to the drawings, our apparatus for performing our method of producing improved fabric covered belt backing includes a frame indicated generally by the reference character 10 along which we arrange a supply station indicated generally by the reference character 12, a folding zone indicated generally by the reference character 14, a heating zone indicated generally by the reference character 16, a pressure zone indicated generally by the reference character 18 and a finished product receiving zone indicated generally by the reference character 20. We provide an extended cooling zone indicated generally by the reference character 22 over the heating and pressure zones 16 and 18 and through which the material passes in a manner to be described hereinafter between the pressure zone 18 and the outlet zone 20.

At the supply station 12 we mount a first roll or reel 24 holding a supply of cover material 26. Preferably as the cover material we use cotton poplin 99/44 count. Customarily this material comes in 45-inch widths. Before we employ the material, however, we slit it to the width required for our finished backing. For example, as will be apparent from the following description, if the finished backing is to be ¾ inch wide, we use a width of poplin 26 on the roll 24 of 1½ inches. If we desire to form a 1 inch wide backing we slit the poplin so as to have a width of about 2 inches. In general we use a width of poplin which is about twice the width of the finished product.

A second roll or reel 28 supported on the frame 10 below the roll 24 carries a supply of a suitable thermoplastic material 30. Preferably for the material 30 we employ an extruded, rubber-modified, polypropylene. This material has a thickness of about 0.013 inch with a variance of plus or minus 0.001 inch. The material is available in a width of about 42 inches. Before employing the material we slit it to form widths which approximate the desired width of the finished product. For example, if the finished backing is to have a width of ¾ inch we slit the material 30 to form ¾ inch widths.

From the roll 24 we pass the poplin 26 around respective idler rolls 32 and 34 on the frame 10 to the folding station 14. The plastic 30 passes from roll 28 through a wiper 36 to the folding station 14. It will be seen that the poplin 26 and the plastic 30 are thus fed in superposed relationship to the folding station 14. We provide a first folder 38 at the station 14. Folder 38 includes a mouth 40 into which the poplin 26 passes. From the mouth 40 folder 38 narrows down to an exit opening 42 which is about half the width of the mouth. This is achieved by bending the edges of the folder gradually inwardly from the mouth 40 toward exit opening 42 to form side walls which direct the edges of the length of cover material 26 upwardly and inwardly as the length passes through the folder.

We provide folder 38 with a guide 44 into which we feed the length 30 of thermoplastic material. Guide 44 causes the length 30 to lie on top of and generally centrally of the length 26 as the two lengths pass through the folder. Owing to this arrangement, as the edges of the length 26 are directed upwardly and inwardly in passing through the folder, they are laid over the length 30 until as the assembly emerges from opening 42, the edges of the length 26 abut generally along the centerline of the length 30.

After passing through the station or zone 14 wherein the folding operation takes place, the two lengths enter the heating zone 16. At the heating zone 16 we provide a heating assembly including a housing 46 having a top 48 of thermally conductive material. We dispose a heater 50 which may, for example, be an electric resistance heater within the housing 46 so that when the heater is energized as by operation of a switch 52, top 48 is heated to a temperature sufficiently high to render the material 30 plastic. We have discovered that it is preferable to apply a slight pressure to the folded lengths as they pass through the heater. This not only retains the folds in the material 26 but, also, it ensures an even heating of the material. We provide the heater with cover plates 54 and 56. Each plate is secured to arms 58 by any suitable means such as welding or the like. Pins 60 supported in brackets 62 swingably support the arms 58 on the top 48 of the housing. We may provide handles 64 to permit the cover plates 54 and 56 to be swung up away from the top 48 when the machine is being set up for operation. In order that the plates 54 and 56 exert sufficient pressure on the assembly as it passes through the heater, we provide them with weights 66.

It is to be noted that we so arrange the heater that the assembly of the length of plastic and folded cover material is constrained to follow a generally upwardly directed curved path in the course of its passage through the heating zone. We have discovered that this path ensures the most efficient heating of the length 30.

After passing through the zone 16 the heated assembly enters a guide 68 which may have a shape similar to that of folder 38. We arrange a bar 70 across the open top of guide 68 just following the entry edge 72 of the guide 68. Guide 68 serves the dual purposes of centering the assembly in the apparatus and of retaining the folds in the assembly before the plastic is cured or set.

We arrange two sets of pressure rolls 74 and 76 and 78 and 80 following the guide 68. Our apparatus includes a motor 82 adapted to be energized in response to operation of a switch 84, for example. A gear box 86 connects motor 82 to a sprocket wheel 88 which drives a chain 90. Chain 90 drives a chain 92 which drives the lower rolls 76 and 80 of the two sets of pressure rolls.

We provide our apparatus with means for adjusting the pressure exerted by rolls 74 and 78 on the material as it passes through the two sets of pressure rolls. For example, a block 94 slidably supported in a sub-frame 96 carries a bearing 98 which supports the shaft 100 of the roll 74. A screw 102 threadably supported in the top 104 of frame 96 is adapted to be turned by a handle 106 to adjust the compression in a spring 108 to vary the pressure exerted by the roll 74. We provide a similar arrangement for the roll 78.

A first vertically extending support 110 carries a plurality of spaced idler rolls 112. A second vertically extending support 114 carries a plurality of spaced idler rolls 116 which are vertically staggered with relation to the rolls 112. After the assembly of lengths reaches the pressure rolls 78 and 80, we train it alternately around a roll 116 and a roll 112 and a roll 116, etc., until the assembly has been constrained to move in a plurality of generally parallel superposed spaced paths. In this manner we provide an extended cooling zone in a relatively small space to permit the plastic to cool gradually. We have discovered that this gradual cooling avoids the tendency which is apparent in arrangements of the prior art for the assembly to curl or twist.

We mount a terminal pair of pressure rolls 118 and 120 for receiving the assembly as it emerges from the cooling zone 22. The lower roll 120 is driven by chain 92 so that the material is under a slight tension as it passes through the cooling zone 22. A baffle 122 directs the finished backing from rolls 118 and 120 into a suitable bin 124 or other receptacle. We have found that the gradual cooling in the extended zone 22, which may contain a length of approximately 300 feet of material, ensures the gradual and thorough setting of the plastic before it is fed to the container, thus avoiding twisting, curling or other distortion of the material which renders subsequent handling and packaging operations extremely difficult.

In operation of our method and apparatus, the driven rolls 76, 80 and 120 and the cooperating pressure rolls 74, 78 and 118 draw superposed lengths of thermoplastic material 30 and fabric, such as poplin 26, having a width approximately twice that of the thermoplastic material successively through the first folder 38 wherein the edges of the poplin are folder over the edges of the plastic so as to abut adjacent the centerline thereof, thence along the curved heater path wherein the plastic is melted and then through the guide 68 to the two sets of pressure rolls 74 and 76 and 78 and 80. In the course of passage through the pressure rolls, the folded fabric edges are firmly pressed into the plastic and the plastic cools sufficiently to retain the edges as the material travels to the first roll 116 in the cooling zone. In the course of its extended travel through the cooling zone, the plastic gradually and completely sets so that when it arrives at the terminal pressure rolls 118 and 120 it is completely cured. We have discovered that the resultant product of our method does not exhibit the undesirable tendency to shrinkage as do belt backings of the prior art.

While we have shown and described our method and apparatus in connection with only one roll 26 and one roll 28, it will readily be apparent that we could arrange a number of rolls in side-by-side relationship and provide a common heater, common pressure rolls and a common cooling system therefor.

It will be seen that we have accomplished the objects of our invention. We have provide a method of and apparatus for forming an improved fabric covered belt backing. Our apparatus and method form backing continuously while avoiding twisting, curling or other distortion of the backing. Our method and apparatus permit the formation of backing continuously in a rapid and expeditious manner.

Having thus described our invention, what we claim is:

1. A method of making backing for a fabric covered belt including the steps of concomitantly drawing a length of outer fabric of a certain width and a length of thermoplastic material of a width appreciably less than said fabric width in juxtaposed relationship from respective supplies through a plurality of zones, folding the edges of said fabric length over the edges of said thermoplastic length in a first zone, butting the folded edges of said fabric adjacent said thermoplastic material in said first zone, applying heat and pressure to said lengths in a second zone to form a united assembly, applying further pressure to said assembly in a third zone to retain the united assembly, and constraining said assembly to move along a plurality of adjacent paths in a fourth zone to cool the assembly and maintaining said assembly under tension in said fourth zone.

References Cited

UNITED STATES PATENTS

| | | | |
|---|---|---|---|
| 231,327 | 8/1880 | Joslin | 156—467 |
| 2,702,067 | 2/1955 | Goldberg | 156—467 |
| 3,038,833 | 6/1962 | Glover | 156—498 XR |

PHILIP DIER, Primary Examiner

U.S. Cl. X.R.

2—338; 156—467; 161—107